June 5, 1928.  
M. A. ADAM  
1,672,743  
FERMENTING VESSEL AND METHOD OF TREATING THE SAME  
Filed Jan. 22, 1923
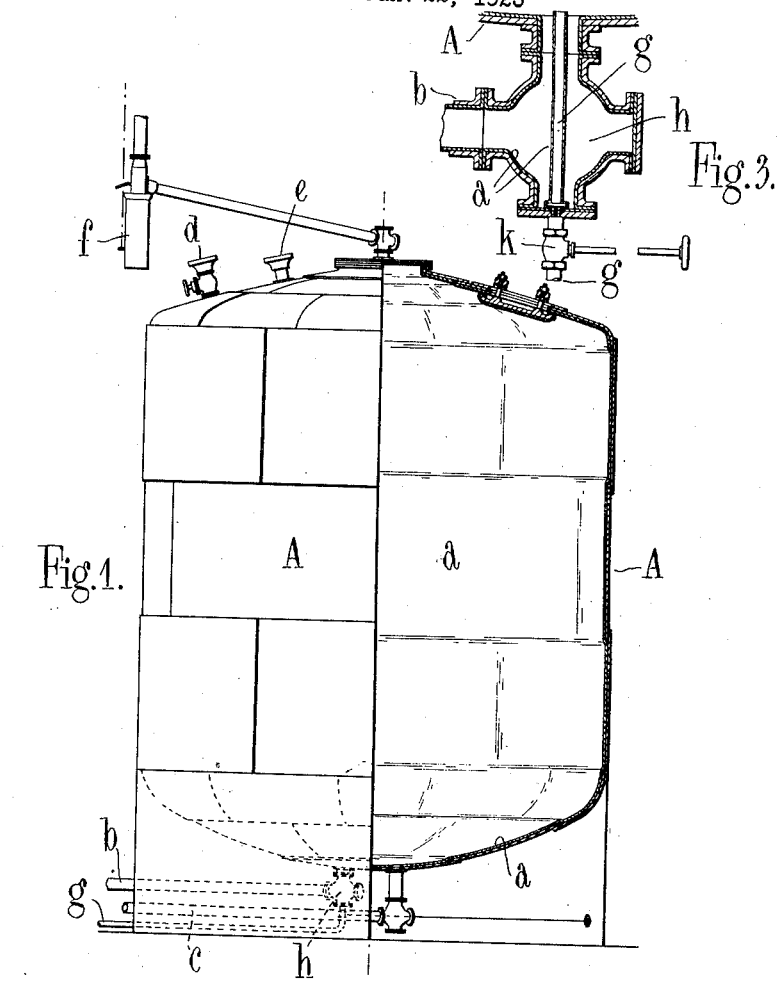
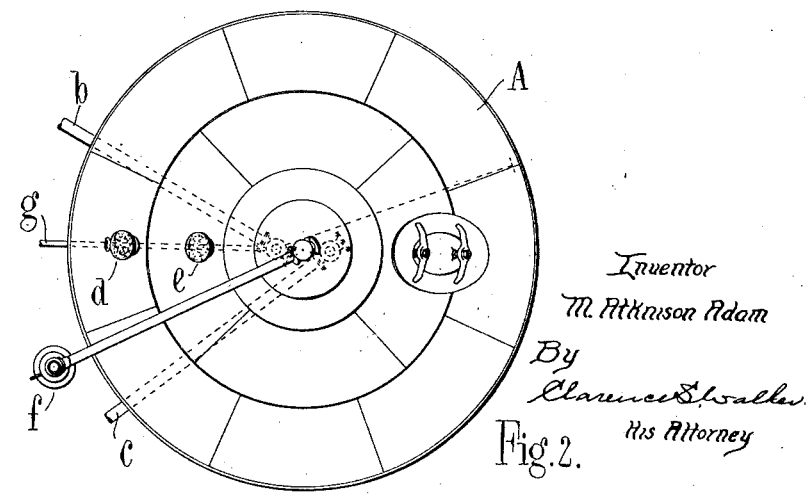

Patented June 5, 1928.

1,672,743

UNITED STATES PATENT OFFICE.

MATTHEW ATKINSON ADAM, OF CHICAGO, ILLINOIS.

FERMENTING VESSEL AND METHOD OF TREATING THE SAME.

Application filed January 22, 1923. Serial No. 614,311.

This invention relates to the fermenting vessels which are used in the fermentation industries, and to a method of preventing contamination of mashes introduced thereinto from a previous fermentation in the vessels.

The vessels used for industrial fermentation processes are necessarily of large dimensions, some, for example, have a capacity of 30,000 to 50,000 gallons. They are usually metal of the steel plate tank construction in order to minimize their cost. Now it has been found that such large vessels are very difficult to sterilize especially as it is usually unsafe for structural reasons to put them under steam pressures sufficient to ensure sterilization.

The present invention has for its object to improve such fermenters and render them easy to clean and sterilize. According to this invention the metal fermenting vessels after thorough cleaning are lined with rubber in an unvulcanized or partially vulcanized state, preferably in sheet form. This rubber lining is subsequently vulcanized by steam heating preferably under pressure which need not be high if it is carried for a sufficient time on the vessel. The rubber layer is thus brought into thorough contact with the metal and adheres thereto so that a smooth elastic lining is formed which is practically unaffected by the variations of expansion of the vessel in heating or cooling.

A fermenter of this character can be easily cleaned by mere washing out or hosing with liquid to remove any adhering material from the lining. Complete sterilization can therefore be easily effected by any of the well known methods.

In carrying this invention into effect in one form, by way of example, as applied to fermenting vessels for use in the production of acetone and butyl alcohol by the fermentation of corn or other carbohydrate mashes such as molasses or the like, I take a fermenter constructed of steel plates riveted together and I line it throughout with unvulcanized but vulcanizable rubber composition in sheet form about one millimeter thick. The joints are preferably beveled and the sheets ironed down against the inside surface of the vessel. All connections are also treated internally as well as the inlet and outlet pipe lines whether for liquids, suspensions or gases, so that the metal is nowhere exposed to direct contact with the liquids or their foams.

When the lining is completed the vessel is filled with steam preferably introduced under pressure and the supply maintained until an effective vulcanization has taken place. In some cases it is not necessary to await complete vulcanization as the maintenance of steam pressure usual for sterilization is sufficient to effect preliminary vulcanization and this is gradually completed under the heating.

In the accompanying drawings, Figure 1 is an elevation partly in section and Figure 2 a plan of an improved fermenting vessel constructed according to my invention. Figure 3 is a sectional view of a detail shown to a larger scale.

A is the metal body of the fermenter lined with a suitable rubber coating $a$; $b$ is the inlet and $c$ the outlet pipe for introduction and withdrawal respectively of the carbohydrate mashes; $d$ is the valve controlled air inlet; $e$ the vacuum valve; $f$ the pressure regulator; and $g$ the inlet pipe for the steam for sterilization.

Instead of lining the vessel with sheet rubber I may in some cases apply the lining by spraying a solution on to the inner surfaces and repeating this operation a sufficient number of times with or without intermediate vulcanization to get the desired thickness of coating. Where it is preferred to employ a rubber gum composition and attach it by vulcanization, other methods of securing an inert elastic coating may be employed.

The metal is thoroughly cleaned from scale, rust and the like before coating preferably by sand-blasting. At all the inlets and outlets and all the pockets formed in the vessels for other purposes the rubber lining is carried right out over all metal parts and into a suitable layer over all internal flanges so as to form good liquid-tight seatings. All pipe lines, valves, and the like used as steam mains, gas vents, liquid conduits, and the like are also coated with rubber in a similar manner and vulcanized on to the metal, so as to present smooth internal surfaces easily cleaned.

In the case of flanged pipes as for a steam or liquid supply main it is convenient to prepare the rubber lining as a tube which can easily be introduced into the pipe and after putting this in place the lining is expanded into contact with the metal by applying pressure through a fluid elastic or inelastic, e. g., steam or hot water. The ends of the tube being arranged to joint on to similar disc rings of the material which become vulcanized on to the flanges, any of the well known heat vulcanizable rubber compositions such as are used for making rubber hose can be used for the linings.

A suitable arrangement of rubber lining *a* for flanged pipes and joints is shown in Figure 3, which illustrates the four way pipe joint *h* connecting the inlet pipe *b*, with the fermenter A. A pipe *b*. the joint *h*, the inlet pipe for steam *g*, and all flanges are shown protected by a rubber lining in accordance with my invention.

A steam cock *k* is provided immediately below the four way joint *h* for control of the steam for sterilization of the fermenter.

A fermenter thus lined can be thoroughly cleaned by fluid flushing or by the application of a steam or liquid hosing, and the nature of the surface is such that while it is unaffected by the expansions and contractions of the metal casing due to heating and cooking it is easily sterilized, i. e., without requiring any large rise of pressure of the sterilizing steam. Furthermore even, although sterilization be not quite complete, the mass of unsterilized material remaining is so reduced that its presence does not substantially reduce the yields of the desired products obtainable.

It will be seen that this invention can be readily applied to existing metal fermenting vessels so that while it has been described particularly with relation to fermenters, I am not limited thereto other than by the scope of the invention as set forth in the following claims.

I claim:

1. A composite fermenting vessel comprising a metal shell provided with a rubber composition lining vulcanized thereto.

2. A method of treating fermenters to prevent substantial contamination between successive fermentations consisting in coating the inner wall of the fermenter with a practically continuous plastic, vulcanizable but unvulcanized material, and vulcanizing such material so that it is attached to the walls of the fermenter, thus forming a lining unattacked by the fermentation medium and products.

3. A method of treating fermenters to prevent substantial contamination between successive fermentations consisting in spraying upon the inner walls of the fermenter a layer of a vulcanizable but unvulcanized material and vulcanizing such material so that it is attached to the walls of the fermenter thus forming a lining unattacked by the fermentation medium and products.

4. A method of treating fermenters to prevent substantial contamination between successive fermentations consisting in spraying upon the inner walls of the fermenter successive layers of a vulcanizable but unvulcanized material, and vulcanizing each layer after it is applied so that it is attached to the walls of the fermenter, thus forming a lining unattacked by the fermentation medium and products.

5. A method of treating fermenters used in the production of acetone and butyl alcohol to make them easy to clean and sterilize, consisting in providing upon the inner walls of such fermenters a smooth lining of a vulcanizable but unvulcanized material, subjecting the lined fermenters to a vulcanizing medium, thus forming an inert coating unattacked by the fermentation medium and products.

MATTHEW ATKINSON ADAM.